US010908130B2

(12) United States Patent
Pellegrino et al.

(10) Patent No.: US 10,908,130 B2
(45) Date of Patent: *Feb. 2, 2021

(54) ASSET INTEGRITY MONITORING USING CELLULAR NETWORKS

(71) Applicant: SENSOR NETWORKS, INC., Boalsburg, PA (US)

(72) Inventors: Bruce A. Pellegrino, Far Hills, NJ (US); James Barshinger, State College, PA (US)

(73) Assignee: SENSOR NETWORKS, INC., Boalsburg, PA (US)

( * ) Notice: Subject to any disclaimer, the term of this patent is extended or adjusted under 35 U.S.C. 154(b) by 423 days.

This patent is subject to a terminal disclaimer.

(21) Appl. No.: 15/169,077

(22) Filed: May 31, 2016

(65) Prior Publication Data

US 2016/0274065 A1 Sep. 22, 2016

Related U.S. Application Data

(63) Continuation-in-part of application No. 14/839,694, filed on Aug. 28, 2015, now Pat. No. 10,247,705.
(Continued)

(51) Int. Cl.
*G01N 29/11* (2006.01)
*G01N 29/44* (2006.01)
(Continued)

(52) U.S. Cl.
CPC ......... *G01N 29/2481* (2013.01); *G01B 17/02* (2013.01); *G01N 29/043* (2013.01);
(Continued)

(58) Field of Classification Search
CPC .. G01N 29/2481; G01N 29/043; G01N 29/11; G01N 29/44; G01N 2291/0258;
(Continued)

(56) References Cited

U.S. PATENT DOCUMENTS 3,611,053 A 10/1971 Rowell
5,349,525 A * 9/1994 Dunki-Jacobs ..... G01S 7/52071
600/437
(Continued)

FOREIGN PATENT DOCUMENTS

GB 2512835 10/2014
WO WO 2010/107712 * 9/2010
WO 2014167285 10/2014

OTHER PUBLICATIONS

Communication pursuant to Article 94(3) EPC dated Mar. 15, 2019 in European Patent Application No. 15845722.6.
(Continued)

*Primary Examiner* — Gregory J Toatley, Jr.
*Assistant Examiner* — Lynda Dinh
(74) *Attorney, Agent, or Firm* — FisherBroyles LLP (57) ABSTRACT

An ultrasound sensing system for monitoring the condition or integrity of a structure, comprising: a plurality of ultrasound sensors, each sensor being configured to receive at least one first electrical signal, transmit an ultrasound signal in response to said first electrical signal, receive at least one reflected ultrasound signal, and transmit a second electrical signal in response to said reflected ultrasound signal, said first and second electrical signals being analog; and at least one digital sensor interface (DSI) to which at least a portion of said sensors are connectable, said DSI being configured to transmit said first electrical signal and receive said second electrical signal, and to generate at least an A-scan signal based on said first and second electrical signals for each sensor, said DSI having a cellular transceiver for transmitting a cellular signal based directly or indirectly on at least said A-scan signal, said cellular signal including an address corresponding to said at least one DSI.

21 Claims, 5 Drawing Sheets

FIG. 1

Related U.S. Application Data (60) Provisional application No. 62/168,422, filed on May 29, 2015, provisional application No. 62/137,532, filed on Mar. 24, 2015, provisional application No. 62/058,592, filed on Oct. 1, 2014.

(51) Int. Cl.

| | | |
|---|---|---|
| *G01B 17/02* | (2006.01) | |
| *H04W 4/70* | (2018.01) | |
| *G01N 29/24* | (2006.01) | |
| *H04W 72/08* | (2009.01) | |
| *G01N 29/04* | (2006.01) | |

(52) U.S. Cl.
CPC ............. *G01N 29/11* (2013.01); *G01N 29/44* (2013.01); *H04W 4/70* (2018.02); *H04W 72/082* (2013.01); *G01B 2210/58* (2013.01); *G01N 2291/0258* (2013.01); *G01N 2291/02854* (2013.01); *G01N 2291/044* (2013.01); *G01N 2291/106* (2013.01)

(58) Field of Classification Search
CPC ....... G01N 2291/044; G01N 2291/106; G01B 17/02; G01B 2210/58; H04B 11/10; H04W 4/70; H04W 72/082; H04W 4/005
USPC .......................................................... 702/39
See application file for complete search history.

(56) References Cited

U.S. PATENT DOCUMENTS

| | | | | |
|---|---|---|---|---|
| 5,408,697 | A * | 4/1995 | Price ...................... | H03F 1/301 330/279 |
| 6,789,427 | B2 * | 9/2004 | Batzinger ............ | G01N 29/069 73/614 |
| 6,984,946 | B2 | 1/2006 | Donnelly | |
| 7,302,866 | B1 | 12/2007 | Malkin | |
| 7,503,218 | B2 * | 3/2009 | Howard ................. | G01N 29/07 73/602 |
| 8,656,783 | B2 * | 2/2014 | Randall ................... | A61B 8/56 73/628 |
| 1,024,770 | A1 | 4/2019 | Pellegrino | |
| 10,247,704 | B2 | 4/2019 | Cegla | |
| 2003/0107475 | A1 * | 6/2003 | Bautista ............ | H04W 52/0229 340/7.35 |
| 2005/0232079 | A1 | 10/2005 | McDonald | |
| 2007/0008560 | A1 | 1/2007 | Eschbach | |
| 2007/0085606 | A1 * | 4/2007 | Thomas ................. | G01N 29/36 330/254 |
| 2007/0095160 | A1 | 5/2007 | Georgeson | |
| 2007/0161904 | A1 | 7/2007 | Urbano | |
| 2009/0157358 | A1 | 6/2009 | Kim | |
| 2010/0206080 | A1 | 8/2010 | Ruzzene | |
| 2011/0067497 | A1 | 3/2011 | Grubb | |
| 2012/0016607 | A1 | 1/2012 | Cottrell | |
| 2013/0185593 | A1 | 7/2013 | Taylor | |
| 2013/0211548 | A1 | 8/2013 | Leinen | |
| 2013/0327148 | A1 | 12/2013 | Yan | |
| 2014/0039754 | A1 | 2/2014 | Nishizawa | |
| 2014/0056104 | A1 | 2/2014 | Buechler | |
| 2014/0204702 | A1 * | 7/2014 | Ratering ............ | G01N 29/0609 367/8 |
| 2014/0238136 | A1 | 8/2014 | Ten Grotenhuis | |
| 2014/0247936 | A1 * | 9/2014 | Shtilman ................ | G06Q 10/10 379/265.03 |
| 2015/0173715 | A1 * | 6/2015 | Raghavan ................ | A61B 8/46 600/440 |
| 2015/0323667 | A1 * | 11/2015 | Przybyla ................. | G01S 15/10 367/103 |
| 2016/0033453 | A1 | 2/2016 | Cegla | |
| 2016/0066894 | A1 * | 3/2016 | Barton-Sweeney ........................ | A61B 5/02055 600/301 |
| 2016/0139082 | A1 * | 5/2016 | Ross ................... | B29C 65/8292 73/588 |
| 2016/0197382 | A1 * | 7/2016 | Sood ...................... | G01N 29/26 429/92 |

OTHER PUBLICATIONS

Communication pursuant to Rule 114(2) EPC dated Mar. 6, 2019 in European Patent Application No. 15845722.6.
Extended European Search Report dated Mar. 27, 2018 in European Patent Application No. 15845722.6.
International Search Report dated Dec. 18, 2015 for correlating PCT Application No. PCT/US2015/053448.
Olympus: "45MG Ultrasonic Thickness Gage User's Manual," Jan. 1, 2012, XP055561711, [retrieved on Feb. 26, 2019].
Communication pursuant to Article 94(3) EPC dated Feb. 4, 2020 in European Patent Application No. 15845722.6.
Ben Joan: "Difference Between FPGA and Microcontroller | Difference Between," Sep. 30, 2009, XP055662661, retrieves from the Internet: URL:http://www.differencebtween.net/technology/difference-between-fpga-and-microcontroller/ [retrieved on Jan. 28, 2020].

\* cited by examiner

ASSET INTEGRITY MONITORING USING CELLULAR NETWORKS

REFERENCE TO APPLICATION

This application claims priority to U.S. Provisional Application No. 62/168,422, filed May 19, 2015, and this application is a continuation in part of U.S. patent application Ser. No. 14/839,694, filed Aug. 28, 2015, now U.S. Pat. No. 10,247,705, issued Apr. 2, 2019, which claims priority to Provisional Application No. 62/058,592 filed Oct. 1, 2014, and No. 62/137,532 filed Mar. 24, 2015, all of the above referenced applications are hereby incorporated by reference.

FIELD OF INVENTION

This invention relates generally to a system for ultrasonically monitoring the condition and integrity of pipes and/or other structures or assets, such as those used in the oil and gas and power generation industries using an improved wireless monitoring scheme and business model.

BACKGROUND

Wall thickness and the presence of defects such as cracks are important factors in determining the fitness-for-service of structures such as above and below ground pipes and tanks, including bulk material and weldments. When a pipe is in operation, it can be subject to corrosion and/or erosion due to the content, flow and/or environmental conditions inside or outside of the pipe. Cracks can form and propagate due to the presence of manufacturing defects, creep, thermal cycling, fatigue and environmental conditions causing defects such as high temperature hydrogen attack (HTHA), stress corrosion cracking, etc. Corrosion and/or erosion results in the reduction in wall thickness, which can reach a point at which operating conditions becomes unsafe, considering that the pipe can be pressurized and may contain hazardous or flammable materials. Likewise formation and propagation of cracks, in welds for instance, can cause similar unsafe conditions. A failure may cause catastrophic consequences such as loss of life and environmental damage in addition to the loss of the use of the asset, and any corresponding costs associated with repair, loss of capacity and revenue loss.

Ultrasonic non-destructive evaluation techniques are commonly used for evaluating the integrity of industrial components. In the case of measuring wall thickness reduction due to erosion/corrosion, the traditional process involves using a portable handheld instrument and ultrasonic transducer (probe) to measure the wall thickness. The instrument excites the probe via an electrical pulse, and the probe, in turn, generates an ultrasonic pulse which is transmitted through the structure. The probe also receives an echo of the ultrasonic pulse from the structure, and converts the pulse back into an electrical signal. The ultrasonic pulses that are transmitted into and received from a structure are used to determine the relative position of the surfaces (i.e. thickness) of the structure wall. More specifically, by knowing the travel time of the ultrasonic pulse from the outer wall to the inner wall and back ($\Delta T$) and acoustic velocity (V) of the ultrasonic pulse through the material of the structure (through calibration or just initialization), a wall thickness (d) can be calculated—i.e. $d = \Delta T \cdot V/2$. In a similar fashion, ultrasound can be used to detect the presence of defects such as cracks. Here, the gauge is set up to look for the presence of ultrasonic echoes returning from the defect. The absence of an echo would indicate a part without a defect. There are many variants of these two basic descriptions of ultrasonic thickness gauging and flaw detection that are known to skilled practitioners of ultrasonic nondestructive evaluation.

These approaches require an operator to manually position a probe on the wall of the asset to take a reading. Not only does this necessitate the operator manually taking each reading, but also the measurement location must be accessible, which can be challenging and costly. For example buried pipelines require excavation to access, insulated pipe requires costly removal of the insulation, offshore assets require helicopter or boat access, and elevated vessels requiring scaffolding or crane access. While the measurement is relatively simple, the cost of access (scaffolding, excavation, insulation removal, etc) is often much higher than the cost of measurement. Moreover, the operator is often subjected to a hazardous conditions while taking the readings. Furthermore, to obtain trending data with thickness resolution of 0.001" or better requires that the transducer be placed in the same exact location for consistent readings at regular time intervals. This is difficult and often impractical especially when the data-capture rate needs to be frequent. Variations in operator and/or equipment tends to skew the quality and integrity of the measurement data.

One approach for avoiding some of the aforementioned problems is to use installed sensors/systems for asset-condition or -integrity measurement. The sensors are permanently or semi-permanently installed on the asset and have features such as wireless data transmission to avoid costly wiring installations. There are even automated systems that require no operator to be in the vicinity of the asset, and that stream data to a control room or to an operator's desk.

Current state of the art systems such as offered by Permasense often utilize mesh networks, such as Zigby, Wireless HART and/or ISA100 for data transmission. Mesh networks utilize a scheme in which a wireless plant network is deployed using the plant's wired Ethernet infrastructure and a Gateway that is deployed on the plant's wired Ethernet. The gateway offers a wireless connection to a set of wireless nodes (e.g., process control or monitoring transmitters) that form a mesh network. In the mesh network, devices can act as transmitters of data messages, receivers of messages, and can relay messages from other devices. These type of networks can have various topologies such as star, mesh and point to point and are well known to those skilled in the art.

This type of device implementation has several major shortcomings. First, the installation cost of such a system is initially driven by the cost of the gateway and gateway installation. While a monitoring device or process controller might cost $2-$4k, it is useless without a gateway which might cost upwards of $10-$20k. An additional cost of $50k or so may incurred to install, power and deploy the gateway in the plant network. Thus, the deployment of even a small monitoring network can be extremely costly and will typically involve capital expense budget sources. However, as funding for inspection and maintenance is typically an operational expense, large capital expense budgets are typically not available for such equipment.

Additionally, these devices must be proximate to the wireless gateway due to the low power and relatively short wireless range of the devices, and the devices must be proximate to each other such that the devices are within range of each other and the gateway. This is a barrier to deploying inspection points as required by the maintenance or corrosion engineer because the device location is not only defined by the desired locations that are of interest for monitoring, but also by the design of the mesh and the placement of the devices and the gateway. Thus, the deployment of such solutions can be complicated and may require more than one gateway to be deployed and/or extra nodes to "fill in" the mesh, even though these extra nodes are possibly not located in areas that are of interest for monitoring. Overall, these factors increase the cost and complexity of deploying a monitoring system using wireless mesh networks.

Furthermore, these mesh networks operate on the facility's IT infrastructure. It is often extremely challenging to deploy new equipment and software that operate on the IT infrastructure of corporations due to concerns of security, data, compatibility and network integrity, etc. Since mesh networks are deployed on a facility's IT infrastructure, devices deployed via mesh networks such as state of the art corrosion monitoring devices, require analysis and approval by the facility's IT department. This offers an additional barrier to the deployment of new monitoring technologies.

Therefore, Applicants recognize a need for a wireless asset integrity monitoring system that is simple and low cost to deploy in facilities, and that is can operate apart from the plant IT infrastructure if need be. The present invention fulfills this need among others.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the invention relates to an ultrasound sensing system for monitoring the condition or integrity of a structure. In one embodiment, the system comprises: (a) a plurality of ultrasound sensors, each sensor being configured to receive at least one first electrical signal, transmit an ultrasound signal in response to the first electrical signal, receive at least one reflected ultrasound signal, and transmit a second electrical signal in response to the reflected ultrasound signal, the first and second electrical signals being analog; and (b) at least one digital sensor interface (DSI) to which at least a portion of the sensors are connectable, the DSI being configured to transmit the first electrical signal and receive the second electrical signal, and to generate at least an A-scan signal based on the first and second electrical signals for each sensor, the DSI having a cellular transceiver for transmitting a cellular signal based directly or indirectly on at least the A-scan signal, the cellular signal including an address corresponding to the at least one DSI.

In one embodiment, the invention involves a battery powered, cellular enabled ultrasonic digital sensor interface (DSI) that is capable of interfacing with and operating ultrasonic transducers for the purpose of inspecting and/or evaluating the condition of industrial assets such as pipes, vessels and heat exchangers. Because the instrument is capable of connecting to and using available, a third party cellular network, it avoids the problems associated with mesh network, gateways, and plant IT infrastructure. This allows the deployment of even single inspection points at low cost, without the expense of gateway installation, and IT personnel evaluation.

In one embodiment, the DSI is connected via an available cellular network to a cloud server(s) that is running an application software that is designed to communicate with the DSI for the purpose of collecting ultrasonic or other data associated with the integrity of the asset being measured. In one embodiment, the application software is also designed to store readings and has a browser based user interface that allows for the display of data and asset integrity information. In one embodiment, the application can be viewed through standard browser enabled devices such as laptop computers, tablets and smart phones.

In one embodiment, the system facilitates enhanced business models that are enabled by a low cost, easily deployable, cellular enabled ultrasonic instrument. For example, one business model involves a monthly subscription plan. In this model, the aforementioned physical hardware (DSI, probes) is provided to the customer free of charge for as long as the customer subscribes to a monthly charge for access to the asset integrity data that is collected from the physical hardware and stored on the cloud server. The customer will be billed a monthly fee for each DSI deployed. This model avoids capital expense budget approvals, shifting the expense to operation expense. In this model, there may be an installation service charge or alternatively, the charge may be financed and amortized over a certain period of the subscription, for example 6, 12, 18 or 24 months. In this model, the product offering becomes the service of providing asset integrity data, rather than the physical hardware itself.

In another business model, the physical hardware is provided to the customer for a nominal fee. The remaining features of the monthly charge and optional financing of installation remains the same.

These business models can be deployed solely by the manufacturer of the equipment or portions such as the hardware installation can be subcontracted to a service company. In this case, the product offering remains the offering of the cloud based asset integrity model. Other embodiments will be known or obvious to one of skill in the art in light of this disclosure.

DETAILED DESCRIPTION

Figure 1:
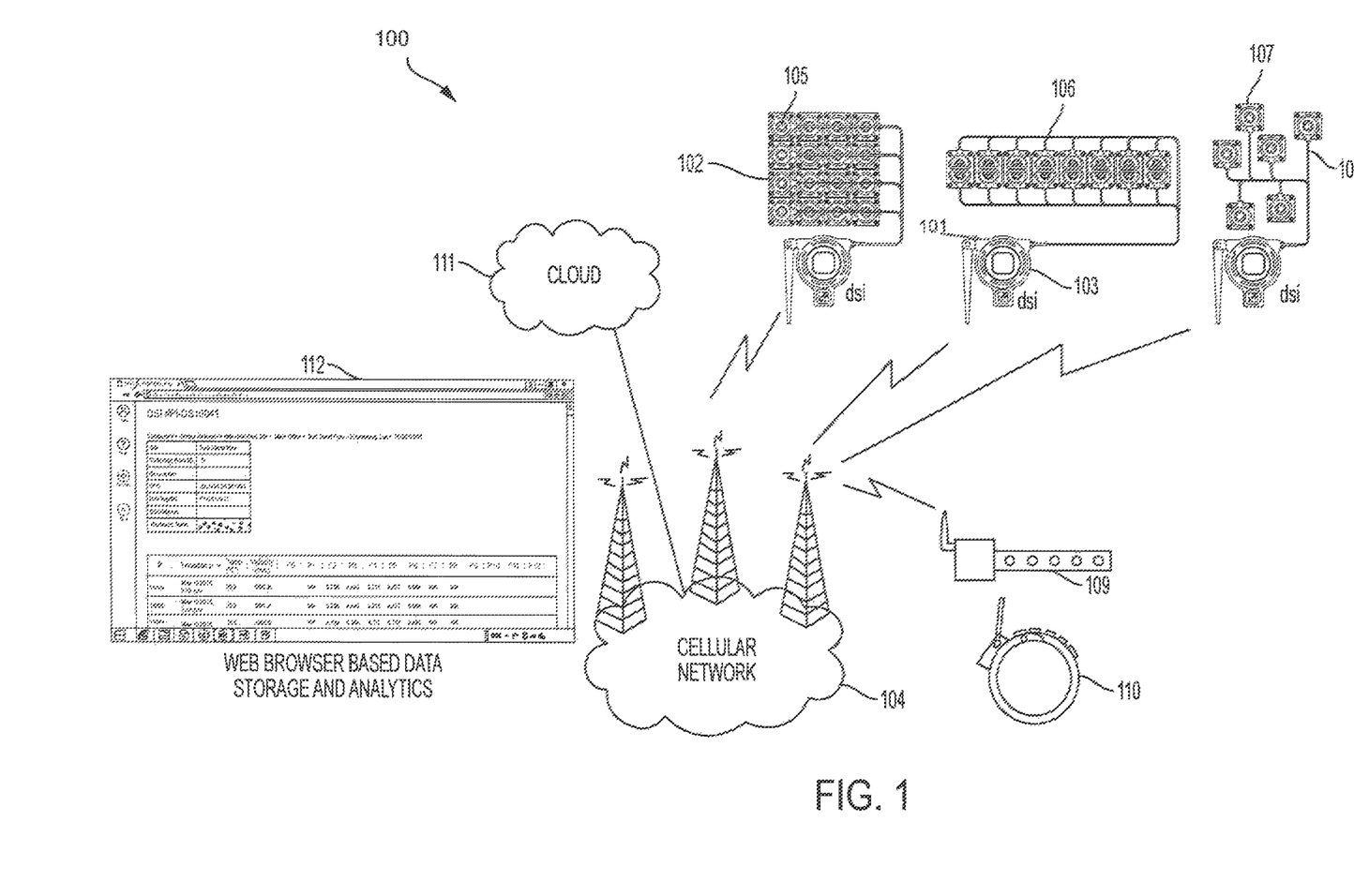
FIG. 1 shows a schematic view of different embodiments of the system of the present invention.

Referring to FIG. 1, schematic views of different embodiments of the ultrasound sensing system 100 of the present invention are shown. In one embodiment, the system 100 functions to determine wall thickness of a structure, and comprises a plurality of ultrasound sensors 102. Each sensor 102 is configured to receive a first electrical signal, transmit an ultrasound signal in response to the first electrical signal, receive a reflected ultrasound signal, and transmit a second electrical signal in response to the reflected ultrasound signal. The first and second electrical signals are analog. The system 100 also comprises at least one digital sensor interface (DSI) 103, to which at least a portion of the sensors 102, are connectable. The DSI is configured to transmit the first electrical signal and receive the second electrical signal, and to record and process a digital time-voltage waveform commonly known as an A-scan based on the first and second electrical signals for each sensor. The digital A-scan signal can be evaluated to perform a wall thickness calculation within the DSI or can be transmitted in whole or part for post analysis.

In this embodiment, the DSI has a cellular transceiver 101 for transmitting a digital signal based directly or indirectly on at least the A-scan signal via a 3rd party wireless cellular network 104. As is known, the cellular network can operate over various frequencies, technologies and standards as is required by the network design. Frequencies include, for example, 850, 900, 1800, 1900 MHz, and technologies/standards include, for example, CDMA, GSM, 3G, 4G, LTE.

In one embodiment, the DSI communicates over the cellular network with a data server(s) 111. The data server may be any known data server, and include, for example, single or multiple computational and data storage devices and can include both discrete computational hardware as well as distributed computational and storage architectures such as would be known as the "cloud computing" and "cloud storage." In this embodiment, the devices serve as the computational and data storage mechanism that receives, processes and stores raw and processed data from the described ultrasonic transducers and cellular enabled DSIs over the cellular network. Associated with the data server is an application software 112 that runs on the data server(s). In one embodiment, the application software 112 is a web browser configured to manage data storage, analytics, user management, and usage tracking.

These components are described in greater detail below.

Sensors

The sensors, 102, function to convert between electronic signals and ultrasonic signals. (As used herein, the term "signal," unless otherwise indicated, may be electrical or ultrasonic, and may be in the form of electrical energy, sound pulse and other forms of electromagnetic or sound waves.) Such sensors are well known and are also referred to as ultrasonic transducers. The transducers and generated/received ultrasonic energy are configured for the purpose of evaluating the integrity of the structure, 101, such as by measuring the remaining wall thickness of the asset or by assessing whether the structure, has flaws such as cracks.

Typically sensors comprise a piezo-electric material such as lead zirconate titanate (PZT), but may also be magnetostrictive, and/or Lorentz force based. The transducer(s) may be deployed in various configurations based upon the nature of the structure and desired test. Exemplary configurations include single element, dual element, angle beam, dual angle beam, single element delay line and may also be configured in such a manner as is required to generate longitudinal waves, shear waves, combined longitudinal and shear waves, surface waves and guided waves as is required by the application of the waves to assess the integrity of an asset.

In one embodiment, the system of the present invention is configured to interface with any known or commercially-available ultrasonic sensor, thus avoiding the need for proprietary sensors and their inherent expense and limited availability. For example, referring to FIG. 4, a variety of sensors are shown for determining wall thickness and detecting cracks. The single-element sensor 501 both transmits and receives ultrasonic signals from the same element 501*a*. Such a sensor is relatively inexpensive and allows one sensor to operate on just one channel. In one embodiment, a single-element sensor 502 is combined with a solid spacer (delay line) 502*b* such that the spacer/delay line is disposed between the sensor element 502*a* and the asset 550. The spacer/delay-line functions to extend the travel time for an ultrasonic signal, thereby increasing the time between the transmit and receive signals, which improves the near surface resolution and also measurement accuracy of single element sensors.

Figure 4:
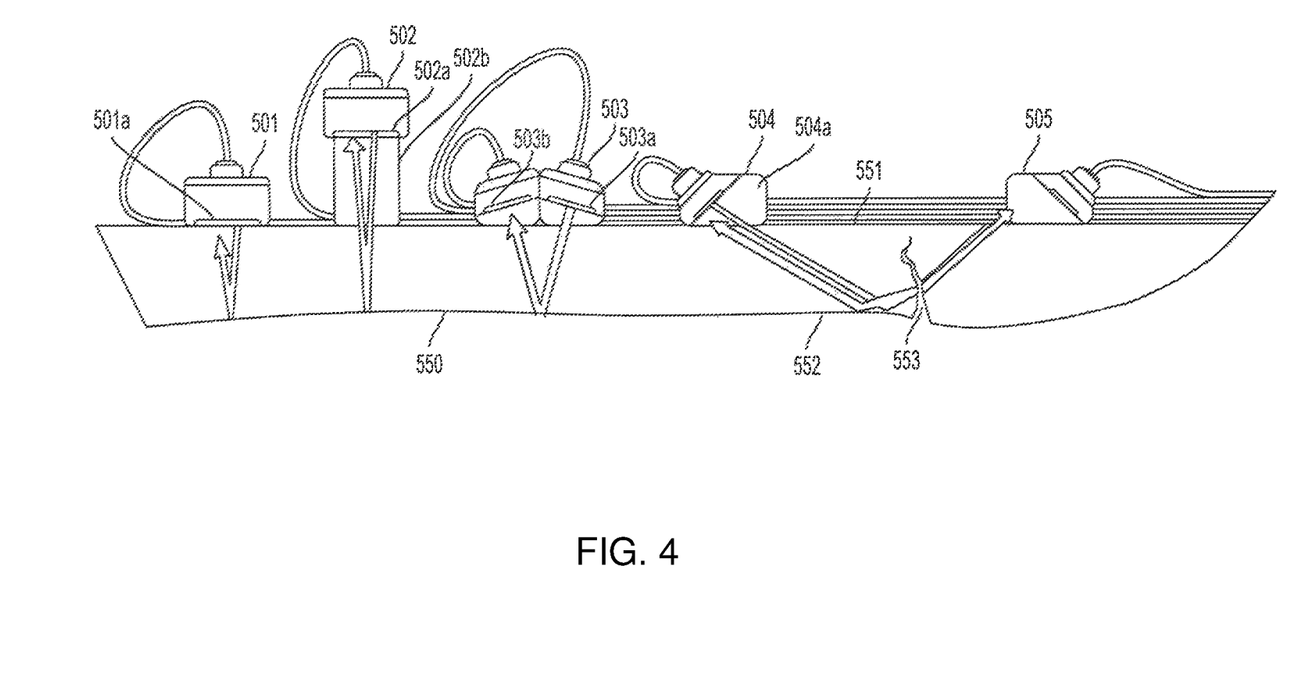
FIG. 4 shows different sensor configurations.
Figure 5:
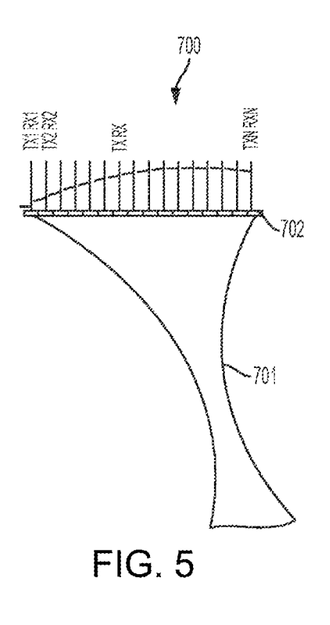
FIG. 5 shows a schematic of a traditional phased array generating a steered focused beam.

Another approach to improve measurement resolution is to use a dual-element sensor 503, which transmits an ultrasonic signal from one element 503*a*, and receives the reflected ultrasonic signal with a second element 503*b*. Although application needs may vary, generally a dual-element sensor can be advantageous for measuring heavily corroded surfaces as the electrical separation between transmit and receive channels allows for the use of increased signal amplification without the deleterious effect of amplifier saturation and recovery due to the transmission pulse.

To measure cracks, voids, welds, or other anomalies that are not parallel to the mounting surface 551 of the asset 550, but generally more perpendicular to the mounting surface, an angle-beam L longitudinal wave sensor 504 or shear wave sensor 504 may be used. In one embodiment, the angle-beam sensor 504 is configured with an angled spacer (wedge) 504*a* to angle the sensor such that it transmits refracts a signal into the asset that is angled relative to the rear surface 552 of the asset. When the signal impinges on the rear surface 552, it is reflected at the same angle (angle of refraction) and continues to propagate in the asset wall 550. As shown, if the signal encounters a crack 553 or similar anomaly, the signal is reflected such that it reflects off of the rear wall back to the sensor 504. Alternatively, rather than reflecting off the rear wall, an additional angle beam sensor 505 may be configured to receive the signal from the transmitting transducer. A defect in the path of the signal will block the transmission to the receiver, indicating the presence of a defect. The choice of the angle-beam L or shear wave sensor depends on the application. The single, delayed, dual element, angle-beam L and shear wave sensors are well known in the art. Examples of commercially-available sensors are available from manufacturers such as Olympus NDT, Imasonic, GE and Blatek.

Referring back to FIG. 1, in one embodiment, groups of sensors are arranged in arrays such as a two dimensional array 105 or a linear array 106, and the arrays interfaced with DSIs as described below. In one embodiment, the array of sensors is fixed semi-permanently to the asset, thus facilitating a wall thickness measurement at the location of each sensor. The sensor array may be implemented in various embodiments. For example, referring to FIG. 1, a medusa configuration 107 is shown in which the sensors consist of individual probes and are cabled to the DSI via relatively short (e.g., <Eft) cables 108. In another embodiment, the sensor array and DSI are implemented in the same physical package 109, 110 as shown in FIG. 1. In one embodiment, the array sensor is fabricated such that it is flexible and can conform to the curved surface of a pipe, pipe elbow or vessel.

As mentioned below in connection with the DSI, each sensor's unique location, both relative to the other sensors in the array and their absolute location as installed on the industrial asset, can be permanently encoded, via a unique serial number or GPS location into the monitoring system for accurate tracking of all future measurements.

In another embodiment, provisions for temperature measurement are included in the system with associated sensors such as thermocouples and thermistors, and associated circuitry and software within the DSI. In one embodiment, there is at least one temperature measuring device per ultrasonic probe. For example, the temperature monitoring devices may be attached to or embedded into the ultrasonic transducers or attached directly to the asset adjacent to the transducers. In another embodiment, one temperature measuring device is used per several ultrasonic sensors. Temperature measurements are taken adjacent in time (just before, during, or after) an ultrasonic measurement and are used to adjust the ultrasonic measurement for changes in ultrasonic (acoustic) velocity due to temperature change. This is required to make more accurate (precise) ultrasonic thickness measurements for example. A software algorithm embedded in the thickness measurement ($d=v/2*T$) can automatically correct "v" for its predicated change in acoustic velocity as a function of asset temperature changes. Sensors for temperature measurement are well known and include, for example, Resistance temperature detector (RTDs) or thermocouples.

Digital Sensor Interface (DSI)

The DSI functions to interface with the sensors 102, and generate a digital signal related to the physical characteristics of a particular structure 101, including, for example, wall thickness, anomalies/cracks in welds for instance. In one embodiment, the DSI interfaces with the sensors by transmitting and receiving the first and second electrical analog signals, as described above, and generating an A-scan signal from which the wall thickness of the structure can be derived. A-scan signals are well known and relate generally to a data presentation by which measureable ultrasonic signals from an object location are displayed. As generally applied to pulse-echo ultrasonics, the horizontal and vertical sweeps are proportional to time or distance and amplitude or magnitude respectively. Thus the location and magnitude of acoustical interfaces are indicated as to depth below the sensor. It should be understood, however, that the A-scan signal may be presented in different forms after processing within the DSI.

Additionally, in one embodiment, the DSI functions to generate a digital signal for output via a cellular network. The digital signal may be based directly or indirectly on the A-scan signal. More specially, in one embodiment, the A-scan signal is merely converted to a digital signal, which is then transmitted via cellular transmission. Alternatively, the digital signal may be indirectly based on the A-scan scan. That is, the A-scan signal may be converted to thickness data as described above, and then the thickness data may be transmitted via cellular. Whether the signal is directly related to the A-scan signal or indirectly related to the A-scan signal is not critical to the claimed invention provided that the output of the DSI is a digital signal comporting with known protocols over wireless cellular. Other embodiments will be known or obvious to one of skill in the art in light of this disclosure.

In one embodiment, the DSI can be configured to store data related to the inspection, including the ultrasonic parameters, such as instrumentation gain, gate positions, and calibration data, as well as contextual data such as GPS coordinates for the DSI and TMLs, asset information, tag numbers, etc. This data may accompany or be integrated with the digital signal transmitted on the digital bus by the DSI, thereby providing the user with critical information related to the specific DSIs, sensors and contextual information of the readings without user intervention. In one exemplary embodiment, the A-scan data, and related ultrasonic parameters and contextual information are formatted into a file type structure and transmitted via wireless cellular. The file architecture can be ASCII text, Comma Separated Values (CSV), XML and binary for example.

The DSI may be configured to interface with any known sensor. For example, in one embodiment, the DSI is a dual-channel ultrasonic device, meaning that it has two independent, analog, transmit and receive channels. These channels can be used independently, each channel being connected to a single ultrasonic sensor, or multiple channels being connected to a multi-element ultrasonic sensor, such as an array. In one embodiment, the DSI acts as a single-channel ultrasonic device, meaning that it can be configured to transmit and receive on a single channel. In an additional embodiment, each ultrasonic channel is multiplexed using an array of switches to increase the number of measurement points. For example, if each channel of the DSI is multiplexed to 16 outputs, then each channel can be connected to 16 ultrasonic sensors for a total of 16 measurement points. Alternatively, the channels may be configured in pairs with dual-element sensors for a total of 8 measurement points.

Furthermore, while the features described thus far have involved each transducer transmitting a single signal to evaluate the health of an asset (e.g., a thickness transducer measuring the part thickness beneath the transducer or a shear wave transducer interrogating a certain portion of a weld), the system of the present invention is not limited to these applications. In particular, because the DSI is near the sensors and thus can perform computations on the analog sensor signals before they become distorted, the DSI may be configured to execute relatively complex signal processing to provide for a host of different outputs and monitoring options, including, for example, thank such as ultrasonic phased array/delay and sum beam forming and full matrix capture (FMC)/total focusing method [TFM]

Ultrasonic imaging techniques involve the generation of an ultrasonic image based upon many sound beams impinging upon an area of interest in the asset/structure. It is well known to those skilled in the art to use ultrasonic imaging to inspect for and size defects in welds. Specifically, ultrasonic images are beneficial for a number of reasons including, for example, the increased volume of the portion of the asset that is interrogated and the additional information that can be gleaned through visual or automated interpretation of the image. From an installed monitoring perspective, the formation of weld images to monitor crack growth is it's particularly advantageous.

Typically, a transducer is moved along the part using robotic manipulation, with "shots" being taken at predetermined intervals. The resulting A-scans are converted into images such as B-Scan and C-Scan types, which are known to those skilled in the art. However, as applied to installed sensors, the use of mechanical manipulation to move the sensor is impractical.

To generate an image using a transducer that is permanently positioned requires the use of phased array techniques in which a transducer is subdivided into many small elements that are each addressed independently from an electrical standpoint. Beam focusing and steering can then be accomplished by controlling the sequence of firing the elements through applied time delays to the ultrasonic transmissions/receptions, and summing the A-scans from all elements together. This method is known to those skilled in the art, and is generically referred to as ultrasonic phased array and "delay and sum beam forming," which is discussed, for example, in "Diagnostic Ultrasound Imaging: Inside Out", 2nd edition, Thomas Szabo, Academic Press; 2 edition (Dec. 26, 2013).

Figure 6:
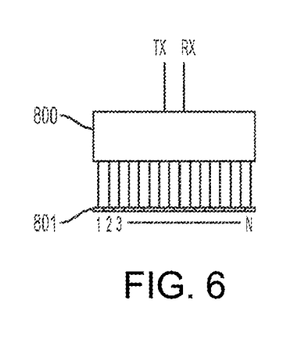
FIG. 6 shows a schematic of one embodiment of a multi-element sensor configured for full matrix capture.

Referring to FIG. 6, a schematic view 700 of delay and sum beam forming is shown. Specifically, by applying a time delay sequence to the ultrasonic transmissions/receptions, a single-focused shaped beam 701 can be formed using a conventional phased array of sensor 702. In this manner, a beam can be steered through the volume of an object to facilitate ultrasonic imaging.

While the proposed use of phased array does allow an ultrasonic image to be made with a permanently installed transducer, it is still typically impractical because the phased array technique requires many parallel system channels and onboard processing which requires excessive cost and power. While it is conceivable that any phased array instrument could be used in a permanently installed fashion, the cost and battery life of such a system makes such a system impractical—at this time. Furthermore, the equipment may not be suitable for installation in the hostile environments adjacent to a transducer location and thus may require long umbilical cables between the probe and instrumentation. This is a common issue when performing phased array inspections inside of nuclear power plant containment. The long umbilical cables severely degrade test performance.

As mentioned above, the present invention is not faced with the problem of signal degradation over long cable length because the DSI is proximate to the permanently installed phased array sensors, and, thus, can perform the computations prior to the sensor signals becoming distorted. Specifically, in one embodiment, the DSI is configured to support single transmit and receive channels, and to use a switch matrix to allow the connection of the transmitter and receiver to any combination of system channels. For example, a DSI with a switch matrix sufficient to connect to 16 transducer elements can be arbitrarily configured with, for instance, the TX channel connected to element 1 and the RX channel connected to Channel 16. This allows the DSI to facilitate the known techniques of full matrix capture (FMC) and total focusing method [TFM], which are described, for example, in C. Holmes, B. Drinkwater, and P. Wilcox, "Post-processing of the full matrix of ultrasonic transmit-receive array data for non-destructive evaluation," NDT & E International, vol. 38, no. 8, pp. 701-711, December 2005, hereby incorporated by reference. In this approach, the DSI has only a single transmit and receive channel, and, therefore, can be designed to be very low power. Further, in one embodiment, the TFM operation is performed in post processing on a PC therefore the DSI is only required to collect and transmit data placing no additional computational burden on the DSI.

Figure 7:
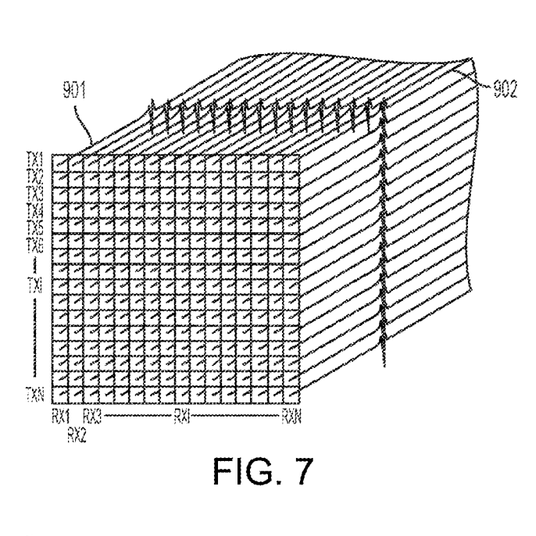
FIG. 7 shows an example of a matrix of data generated using the sensor of FIG. 6.
Figure 8:
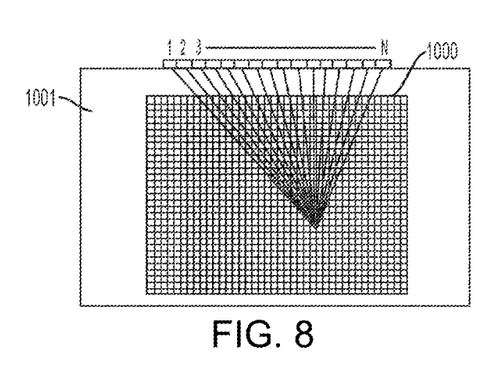
FIG. 8 shows shows an example of a reconstruction grid based on the matrix of data of FIG. 7.

The concept of full matrix capture is described by FIG. 7. A transducer 800 having N elements 801 is shown, where the transmitter (TX) is connected to transducer element j and the receiver is connected to transducer element i. A waveform is collected for each combination of i=1 to N and j=1 to N, creating a matrix of data 901 as shown in FIG. 8. Thus, for an N element transducer, N squared A-scans 902 are collected. These A-scans 902 are transmitted from the DSI to a data collection device such as a tablet PC, industrial PC or to cloud storage as mentioned above.

The second process in the image formation is called the total focusing method (TFM) and, in one embodiment, is performed outside the DSI, for example, on the data collection device, in the cloud or with the user's PC. Specifically, in one embodiment, the steps of applying TFM comprise: (1) defining a computation zone 1001 within the asset/structure. (2) Within that computation zone, defining a reconstruction grid 1000 with defined shape and spacing as shown in FIG. 9. For example, a rectilinear grid with 1 mm×1 mm spacing. (3) At each grid point, computing a time delay for each combination of transmit and receive element, so for an N element array, NA2 time delays are defined. (4) The data point in each A-scan that corresponds to the calculated time in step 3 is collected and summed. This process is repeated for all points of the reconstruction grid. (5) Optionally, a process known as scan conversion can be applied to resample the data points from the reconstruction grid to an image grid, for instance to match screen resolution. (6) A pseudo-color image may then be created by applying a map of colors based upon the amplitude of the data points in the image grid (or reconstruction grid). (7) Pseudo-A scans can also be generated by "slicing" the reconstructed data in a single dimension. Additional operations such as upsampling, gating, threshold detection, and zero crossing measurements can be applied to the A-scan as are known to those skilled in the art. Therefore, in this way, the system of the present invention can be configured to provide ultrasonic images of asset portions of interest rather than simple measurement data.

The system of the present invention can also be configured to provide sophisticated trending information because of the accuracy in the repeatability of the measurements taken. As mentioned above, because the present invention employs permanently installed sensors and stores contextual data, it essentially eliminates variations in repeated measurements. This facilitates sophisticated monitoring for trends. This coupled with the ability of cloud-based data analysis to provide constant and sophisticated analysis of the data obtained, leads to more advanced alarm logic. For example, in thickness gauging, basic alarming might include performing an action such as sending a text message to an interested party when the thickness of a TML falls below a prescribed minimum. This would be described by the following logical expression:

if (t<tmin=true) send alarm.

Basic alarms that are common might also include multiple levels of alarming such as t<twarning to flag a TML that has reduced to a point that an operator might want to watch the point but that is not at an absolute minimum value. Corrosion rates might also be alarmed such as an instance where the rate is greater than 10 mils per year.

While these alarms are useful, there is additional capability to be had through the inclusion of more logical expressions. This is accomplished by adding the following operators to the software such as the following: Not, And, Or, Equivalent and NEquivalent. For example, an expression could be constructed as follows:

if (t<twarning).and.(rate>10) send alarm.

Many other expressions will be obvious to those of skill in the art in light of this disclosure.

In one embodiment, the DSI is configured to collect and upload asset integrity data according to a schedule for the purpose of battery management. In one embodiment, the DSI is intended to operate on batteries (such as two C cells) for several years—for instance between 3 and 15 years. One way to accomplish this is to manage the time that the cellular radio is powered as the cellular radio and data transmission requires relatively high amounts of power. Additionally, the UT block tends to be relatively high power, therefore it is also advantageous to keep the UT Block in an unpowered state when the DSI is not making UT measurements. Therefore, in one embodiment, only the microcontroller is powered when the DSI is at rest, and, furthermore, the microcontroller is configured to rest in a low power state and have a real time clock that can wake up the microcontroller and areas of the circuit, such as the UT Block and Cellular Radio, only when those circuits are desired to perform a function, such as take a measurement for the UT Block or transmit a measurement for a cellular radio. In one embodiment, a real time clock is designed into the DSI either as a discrete circuit or as part of the microcontroller to manage the scheduling of various tasks and thus manage the power consumption of the device.

An exemplary measurement schedule to manage and extend battery life might be as follows: (1) wake the UT block up periodically (e.g., two times per day) to make a measurement of asset integrity and store this data in memory; and (2) wake up the cellular radio less frequently than the UT block (e.g., once per week) to upload all of the readings that were collected in the past week. In this fashion and based upon knowledge of the power draw of various parts of the circuit, a measurement and upload schedule can be designed to achieve measurement goals and extend battery life as long as possible.

Figure 2:
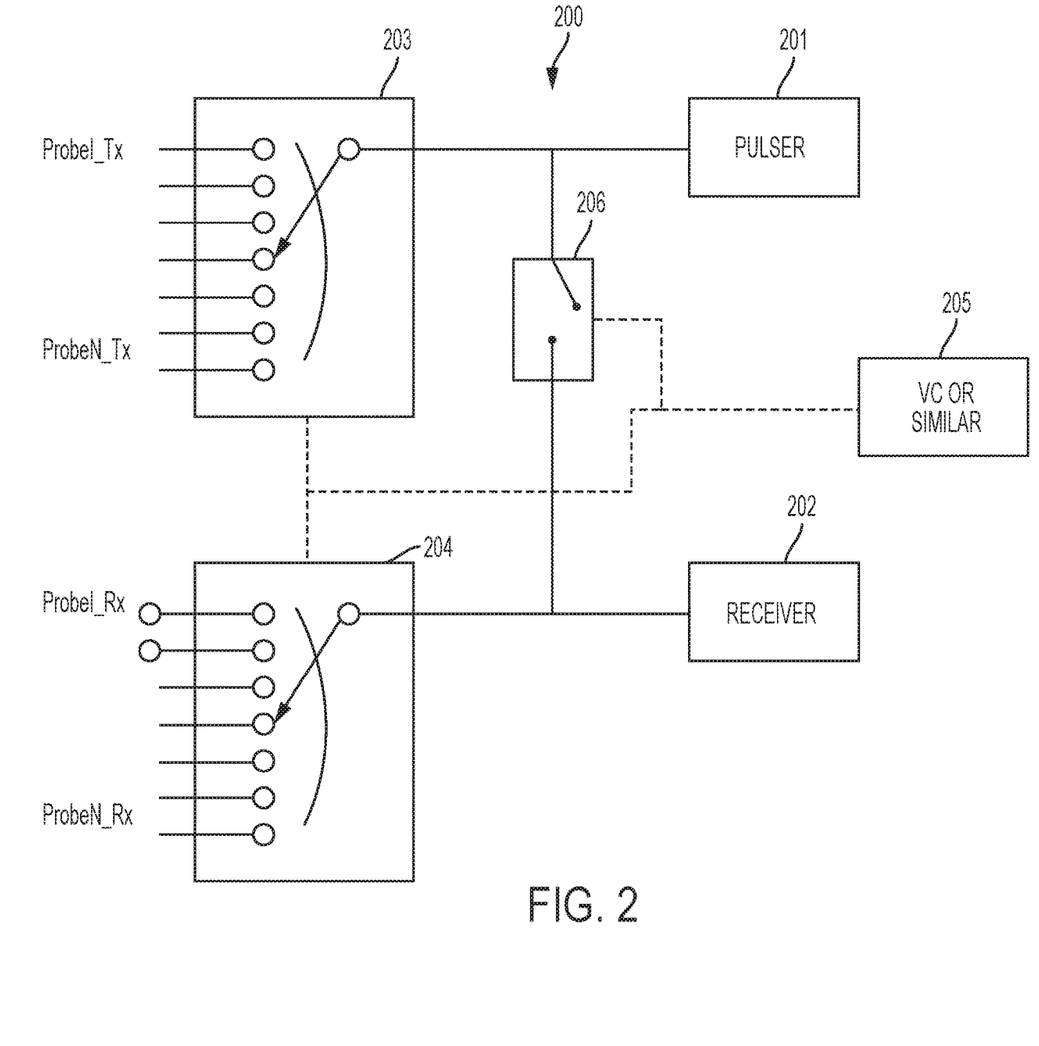
FIG. 2 shows a schematic view of a dual probe multiplexer.
Figure 3:
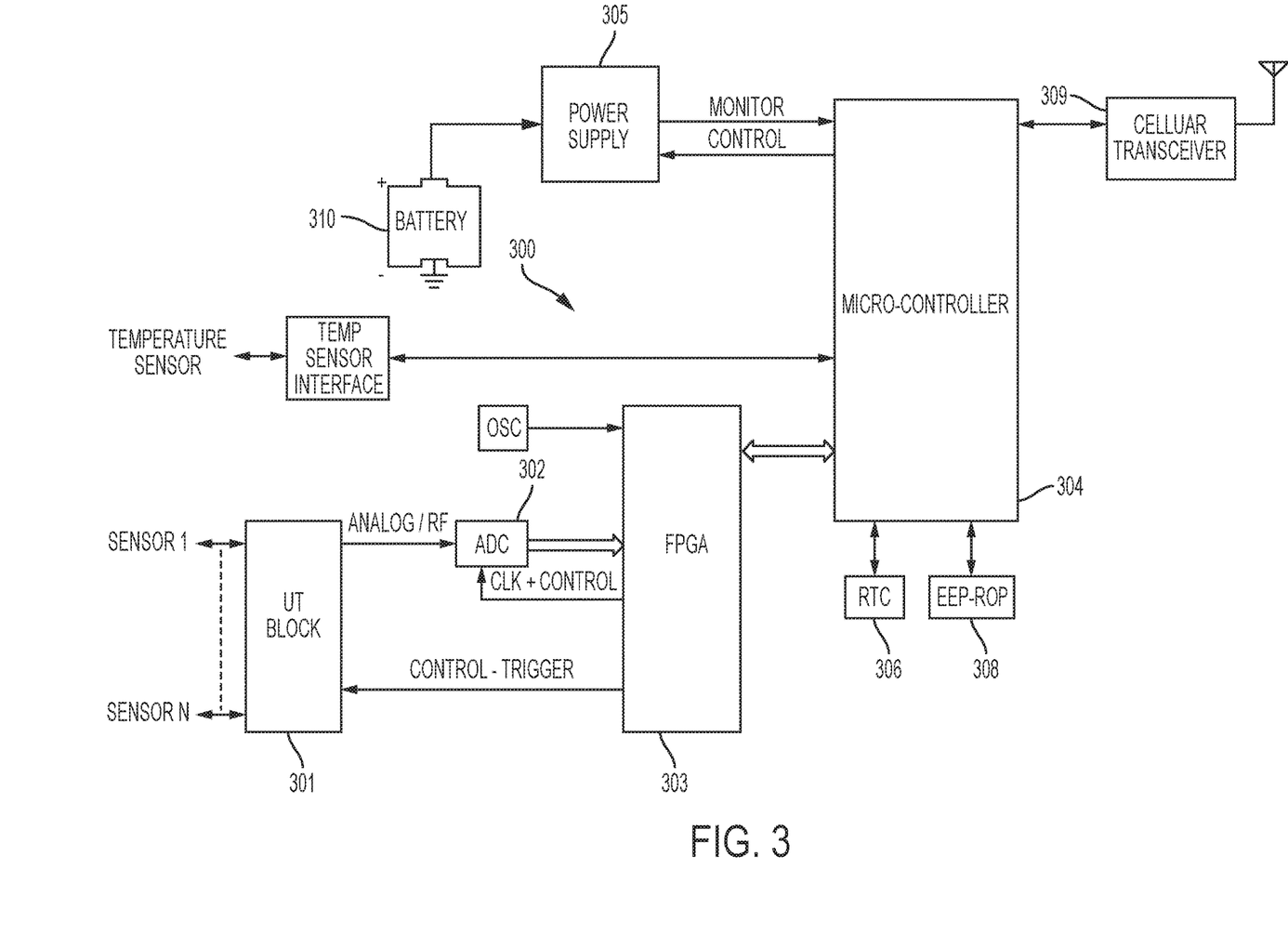
FIG. 3 shows a block diagram of one embodiment of a DSI unit of the system of present invention.

Referring to FIG. 3, a block diagram of the architecture 300 of a specific embodiment of the DSI is considered in detail. In one embodiment, the DSI comprises a UT Block 301. An example of a UT block 200 is illustrated schematically in FIG. 2. Referring to FIG. 2, a "pulser" circuit 201 that is designed to produce a voltage waveform to excite the transducers. The waveform can be a simple "spike" pulse, a square wave (e.g., at least 1 or more half cycles), a sine wave, a sawtooth wave, a chirp or other type as appropriate for the type of transducer and ultrasonic application. A receiver circuit 302, contains one or more stages of amplification and attenuation to appropriately size the incoming voltage waveform prior to digitization. The receiver section may also contain analog filters to condition the signal and may implement highpass, low pass or band pass filters. Between the pulser/receiver and the transducers is a switch or set of switches 203, 304 to multiplex the P/R channel selectively to multiple transducers. In one embodiment a 1×16 or 1×32 multiplexer is used. Additionally, the P/R circuits may be separated along with the multiplexer switches as appropriate for dual element transducers, for example having a 1×8 multiplexer on the pulser circuit and a 1×8 multiplexer on the receiver to address 8 dual element transducers.

A common control (microcontroller or similar) 205 may be used to ensure the settings of each individual switch are set such that the TX and RX elements in the probe are connected to the pulser and receiver channels at the same time. In one embodiment, separate switches are used for TX and RX channels. This separation allows for maximum electrical isolation between the TX and RX sides of the probe, thus reducing electrical crosstalk and thus maximizing measurement performance. Optionally, a switch 206 can be placed between the pulser and receiver channels to automatically switch the circuit between single element mode and dual element mode. In an exemplary configuration, this switch is a relay or physical jumper in order to achieve the high level of isolation between the transmitter and receiver that is usually required in dual element mode. Other embodiments will be known or obvious to one of skill in the art in light of this disclosure.

Referring back to FIG. 3, the analog signal from the UT block 301 feeds into a digitizer 302 to convert the analog voltage waveform to a digital signal. The digitizer is then connected to an FPGA 303, for additional processing and temporary storage of the digital data. The FPGA may implement additional signal conditioning, such as filters, and may measure the signal in amplitude and/or time, including optionally performing a thickness measurement or flaw detection algorithm within the FPGA. Other embodiments will be known or obvious to one of skill in the art in light of this disclosure.

The raw data as well as other outputs and/or results are then sent to an attached microcontroller 304. The microcontroller serves to manage operation of the DSI including power management through activating the various blocks of the circuit when needed.

The embodiment of the DSI disclosed here also comprises a cellular interfance or transceiver 309 for transmitting and receiving data over a cellular network. Such cellular transceivers are well known and commercially available. Although a cellular transceiver is disclosed herein, it should be understood that, in other embodiments, the cellular interface may be a discrete transmitter and/or receiver.

In one embodiment, the DSI 300 also comprises battery 310 to eliminate the need for wired power to generate the various DC voltages required by the circuit and cellular radio, 309, for transmitting and receiving information, data and/or signals over a cellular network. Suitable batteries are well known and include those used for voice/cell phone communications. It should be understood, that if an alternative power source is available then the DSI need not comprise a battery.

Additionally, in one embodiment the DSI also comprises various peripheral components to the microprocessor, including, for example, a Real Time Clock 306, temperature sensor interface 307, and serial EEPROM memory 308.

Cellular Network

Cellular networks are well known. Typically, a cellular network is a radio network distributed over land through cells where each cell includes a fixed location transceiver known as base station. These cells together provide radio coverage over larger geographical areas. User equipment (UE), such as mobile phones, is therefore able to communicate even if the equipment is moving through cells during transmission. Cellular networks give subscribers advanced features over alternative solutions, including increased capacity, small battery power usage, a larger geographical coverage area and reduced interference from other signals. Popular cellular technologies include the Global System for Mobile Communication, general packet radio service, 3GSM and code division multiple access. Generally, the cellular network can operate over various frequencies, technologies and standards as is required by the network design. Frequencies include for example 850, 900, 1800, 1900 MHz. Technologies/standards include, CDMA, GSM, 3G, 4G, LTE, for example. In one embodiment, the cellular radio in the DSI is implemented on a radio module such that the an appropriate radio module can be inserted to operate with the available cellular network.

Cloud Storage and Processing

In one embodiment, the DSI collects and processes the data and formats the data into a file to then push to cloud storage 111, for easy access by inspection personnel or asset owners. As used herein, the term cloud-based storage is a model of data storage where the digital data is stored in logical pools, the physical storage spans multiple servers (and often locations), and the physical environment is typically owned and managed by a hosting company. Cloud storage services may be accessed through a co-located cloud compute service, a web service application programming interface (API) or by applications that utilize the API, such as cloud desktop storage, a cloud storage gateway or Web-based content management systems. Thus, cloud-based storage for the ultrasonic measurements and related installation parameters enables the use of web-based data access, 112, from any fixed or mobile device having Internet connectivity and advantageously offers a relatively low cost solution for implementation of asset integrity monitoring devices as now software or hardware must be deployed on a customer's IT infrastructure. Data access is then accomplished through any "connected" mobile or computational device with an internet browser.

In one embodiment, the DSI transmits the A-scan signal or similar signal in essentially "raw" form for cloud-based computing. Cloud computing relies on sharing of resources to achieve economies of scale. Cloud computing focuses on maximizing the effectiveness of the shared resources. With cloud computing, multiple users can access a single server to retrieve and update their data without purchasing licenses for different applications. Thus, in this embodiment, cloud computing performs the calculations on the A-scan signal to determine wall thickness or detect flaws. Generally, determining when and where to calculate the thickness data from the A-scan signal is a question of optimization. For example, it may be preferable to convert the A-scan signal to thickness data in the DSI to save on storage space because the A-scan signal data consumes more space than the thickness data. On the other hand, converting this signal to thickness data tends to require more processing power, thus, more energy needs to be provided to the DSI which may adversely affect battery life. Advanced processing of data such as measurement trending and statistical analysis will also rely on cloud computing.

An important aspect of operating over public networks is security. Customers need to have their data secure from corruption, theft, and hacking. The use of cellular networks offers an important advantage because the measurement device is not connected to the plant network, and, therefore, is not a door to be opened by hackers. Rather, the data can be stored in a secure cloud environment. However, cellular data networks by themselves are not encrypted. To protect the client's data, some level of encryption is generally preferred, although not required. In an embodiment, the data to be transmitted to cloud storage is encrypted by the DSI prior to transmission, transmitted to the cloud, and then decrypted at the cloud server. The encryption can take several forms, including, for example, an implementation of a proprietary algorithm, or can be a standard method such as SSL/HTTPS. In an additional embodiment, a virtual private network (VPN) is set up between the DSI's and the cloud storage. Additional encryption may also be desired at the cloud storage database.

Usage and Business Model

Yet another aspect of the invention is the method of use and business model. A first exemplary use is the monitoring of corrosion in O&G facilities. The DSI and probes are installed in the facility and set up for use. The DSI is configured to operate on an available cellular network. Configuration may involve inserting a SIM card (for a GSM radio) or otherwise activating the cellular radio such as providing an IMEI number to the cellular provider. The DSI schedule is set for the measurement reading frequency and upload frequency. After setup, the DSI automatically wakes up on a predetermined reading schedule, for example once per day and will take ultrasonic readings of the asset and any other sensor readings for configured sensors such as temperature measurement devices. The readings will be stored in the DSI memory until they are uploaded. The DSI also automatically wakes up on a predetermined upload schedule—for example once per week and activates the cellular radio. Once activated, the cellular radio connects to the appropriate cellular network and uploads the stored result(s) file to the cloud server. The cloud server stores readings and post processes the readings if desired—such as compensation for temperature drift or statistical analysis of the corrosion rate. In one embodiment, the cloud server also generates alarms if the measured wall thickness is below preset thresholds or the corrosion rate is above preset thresholds. Alarms can be simply color coding of displayed readings in the UI or could involve the generation of email or txt messages to appropriate personnel. In one embodiment, the server also hosts a user interface that is accessible from a web browser to allow users to view and interact with the measured data.

Due to the novel aspects of this invention, the equipment and software, including probes, DSI, cellular network, cloud server/application are deployed externally to the customers IT infrastructure. This allows new models of business for corrosion monitoring as the equipment can be deployed in a low cost fashion. For example, in one business model, the equipment is provided free of charge to the customer. The customer pays a monthly contract amount with a guaranteed performance period for the contract—for instance 24 months. Hardware installation fees are paid upfront or amortized over the contract period.

Another business model is similar to the first but the customer purchases, leases, or rents the physical hardware. A monthly contract amount is paid by the customer for access to the data on the cloud server.

Yet another business model is that the customer purchases, leases, or rents the physical hardware. The customer chooses not to use the cloud service and rather the DSI emails the data directly to a specified email address via an SMTP server.

Many other models will be obvious to those of skill in the art in light of this disclosure.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What we claim is:

1. An ultrasound sensing system for monitoring the condition or integrity of a structure, comprising:
   at least one ultrasound sensor being configured to receive a first electrical signal, transmit an ultrasound signal in response to said first electrical signal, receive a reflected ultrasound signal, and transmit a second electrical signal in response to said reflected ultrasound signal, said first electrical signal and said second electrical signal being analog;
   at least one digital sensor interface (DSI) physically connected to said at least one ultrasound sensor, said at least one DSI having at least a microprocessor and a UT Block comprising at least one transmit circuitry configured to transmit said first electrical signal and a receive circuitry configured to receive said second electrical signal, said DSI configured to generate at least an A-scan signal based on said first electrical signal and said second electrical signal for said at least one ultrasonic sensor, said at least one DSI having a wireless transceiver for transmitting a wireless signal comprising data based directly or indirectly on at least said A-scan signal; and at least one battery for powering said DSI;

wherein said DSI is configured to rest in a rest mode to conserve power consumption and to wake up periodically in a wake up mode to collect said data, thereby reducing power consumption of said at least one battery, wherein, when in said rest mode, said UT Block is unpowered and said microprocessor is configured to operate in a low power state, and wherein, when in said wake up mode, said UT Block is powered and said microprocessor operates at a power state higher than said low power state.

2. The system of claim 1, wherein said at least one DSI comprises encryption functionality for encrypting said wireless signal.

3. The system of claim 1, wherein said wireless signal comprises measurement data based on said A-scan signal.

4. The system of claim 3, wherein said wireless signal does not comprise said A-scan signal.

5. The system of claim 1, wherein said at least one ultrasonic sensor comprises a plurality of sensors and wherein said plurality of sensors is connected to a single DSI.

6. The system of claim 1, wherein at least one ultrasound sensor is a multi-element sensor and said DSI is configured to execute full matrix capture on data obtained from said multi-element sensor.

7. The system of claim 1, wherein said wireless transceiver is a cellular transceiver.

8. The system of claim 7, wherein said cellular transceiver is configured to call out, and not to receive calls.

9. The system of claim 7, wherein said cellular transceiver communicates over a cellular network with a data server.

10. The system of claim 1, wherein said wireless transceiver communicates with a data server.

11. The system of claim 10, wherein said DSI comprises functionality to establish a virtual private network (VPN) between said at least one DSI and said data server.

12. The system of claim 10, wherein said data server is a cloud-based server.

13. The system of claim 10, wherein said data server is a local server.

14. The system of claim 10, wherein said data server is configured to use a total focusing method on said data of said full matrix capture to generate an ultrasonic image.

15. The system of claim 14, wherein said data server is a remote, distributed computational resource.

16. The system of claim 14, wherein said data server is configured to use a total focusing method on said data of said full matrix capture to determine wall thickness of said asset.

17. The system of claim 1, wherein, when in said rest mode, said wireless transceiver is unpowered.

18. The system of claim 1, wherein said DSI has a real time clock that wakes up said microcontroller and said UT Block.

19. The system of claim 18, wherein said real time clock is either a discrete circuit in said DSI or is part of said microcontroller.

20. The system of claim 1, wherein said microprocessor wakes up said UT Block up based on a first period to collect said data, and wherein said microprocessor wakes up said wireless transceiver based on a second period to transmit said data, wherein said first period is shorter than said second period.

21. The system of claim 20, wherein said at least one DSI is configured to collect said data daily and to store said data in memory, and to wirelessly transmit said data stored in said memory weekly.

* * * * *